United States Patent [19]

Staudinger et al.

[11] Patent Number: 5,008,826
[45] Date of Patent: Apr. 16, 1991

[54] METHOD AND APPARATUS FOR BALANCING A WHEEL OF A VEHICLE OR THE LIKE

[75] Inventors: Alfons Staudinger, Munich; Hermann Bux, Pöcking/Possenhofen, both of Fed. Rep. of Germany

[73] Assignee: A. Rohé GmbH, Schollkrippen, Fed. Rep. of Germany

[21] Appl. No.: 305,395

[22] Filed: Feb. 2, 1989

[30] Foreign Application Priority Data

Feb. 4, 1988 [DE] Fed. Rep. of Germany ...... 3803325

[51] Int. Cl.⁵ .................................................. G01M 1/22
[52] U.S. Cl. .................................. 364/463; 364/508; 73/66
[58] Field of Search ............... 364/463, 508, 571.01, 364/506; 73/462, 66, 457, 458

[56] References Cited

U.S. PATENT DOCUMENTS

| | | | |
|---|---|---|---|
| 4,223,386 | 9/1980 | Maruyama et al. | 364/506 |
| 4,285,240 | 8/1981 | Gold | 73/462 |
| 4,450,529 | 5/1984 | Hill et al. | 364/508 |
| 4,457,172 | 7/1984 | Mathes et al. | 73/462 |
| 4,502,328 | 3/1985 | Wood et al. | 73/462 |
| 4,776,215 | 10/1988 | Curchod | 73/462 |
| 4,817,421 | 4/1989 | Himmler | 73/146 |

OTHER PUBLICATIONS

"Structural Testing using Model Analysis," Brüel & Kjaer, brochure, best available date 1988.
Mesures Regulation Automatisme, vol. 44, No. 11, Nov. 1979, pp. 97–108; J.-F. Cros.: "Comment soigner les machines tournantes . . . Qui Vibrent".
Soviet Inventions Illustrated, week 8721, Abstract No. 149423/21, S02, Jun. 3, 1987, Derwent Publications Ltd., London GB & SU-A-1262 319, (Transcau Metalcut) Oct. 7, 1986.
Taschenbuch der Physik, H. Kuchling, Verlag Harry Deutsch, Thun. u. Frankfurt/Main, 1978, pp. 124, 125, 126.

Primary Examiner—Thomas G. Black
Attorney, Agent, or Firm—Beveridge, DeGrandi & Weilacher

[57] ABSTRACT

A balancing apparatus comprises a shaft on which a wheel may be mounted drivably for rotation. Electrical sensors are coupled to the shaft and issue sensor output signals when forces are acting on the wheel. A computer calculates the unbalance data from the sensor output signals in combination with specific wheel data and displays the result. The wheel at rest is made vibrate and the specific wheel data are calculated from the sensor output signals issued by the sensors on vibration of the wheel, the sensor output signals being compared to sample signals being specific for each particular type of wheel and having been stored together with the specific wheel data. In case of identity of the sensor output signals with the sample signals the specific wheel data are made available for calculating the unbalance data. The sensor output signals issued when the wheel is driven, are transformed into an unbalance frequency spectrum and the unbalance data are calculated from the unbalance frequency spectrum.

23 Claims, 5 Drawing Sheets

METHOD AND APPARATUS FOR BALANCING A WHEEL OF A VEHICLE OR THE LIKE

BACKGROUND OF THE INVENTION

The invention relates to a method for balancing a wheel of a vehicle or the like with the aid of a balancing apparatus comprising a shaft on which a wheel is adapted to be mounted rotatably and drivably, electrical sensors being coupled to the shaft and issuing sensor output signals when forces are acting on the wheel, and a computer calculating the unbalance data from the sensor output signals in combination with specific wheel data, as well as to an apparatus for carrying out the method.

From the German publication No. DE-OS 3629059 a method and an apparatus of the above-cited kind are known. For calculating the specific wheel data, two reference weights are mounted spaced from one another at an angular distance at the rim, and the forces being exerted on the sensors when the wheel is rotated are measured. Subsequently, the reference weights are removed and the forces are measured again. The two measurement results are mutually correlated for obtaining the unbalance data. This method presupposes two measuring operations and and twice installing the reference weights at the respective positions. Therefore, the measurement of the unbalance is intricate and the accuracy thereof depends on the exactness with which the reference weights have been installed.

SUMMARY OF THE INVENTION

As compared thereto it is the main object of the present invention to render the measurement of unbalance more accurate and simpler, too For this purpose the method of the present invention is characterized in that the wheel at rest is made vibrate and that the specific wheel data are calculated from the sensor output signals which are issued by the sensors on vibration of the wheel. The most simple and therefore preferred way of causing the wheel to vibrate lies in that the wheel at rest is made vibrate by means of a blow. The natural vibration of the stationary wheel has features being specific for the respective type of wheel, on the basis of which properties it can be found out which type of wheel is to be dealt with. The detection of the specific features of the natural vibration, as a rule, can only be effected with the aid of the theory of vibrations, and upon the characteristic data having been found, those may be correlated to the corresponding specific wheel data and be made available for the calculation of the unbalance values.

A preferred embodiment of the method according to the present invention, however, is characterized in that sample signals being specific for one type of wheel each and relating wheel data are stored, that the sensor output signals are compared with the sample signals and that in case of indentity of the sensor output signals and the sample signals the corresponding specific wheel data are made available for calculating the unbalance values. It is more simple to effect the comparison of the sample signals and the sensor output signals with the aid of electronic measures than to analyze the sensor output signals under the points of view of the theory of vibrations.

In order to render it easier to compare the sample signals with the measured sensor output signals a preferred embodiment of the method under the present invention is characterized in that the stationary shaft without wheel is made vibrate, that the issued sensor output signals are stored as adjustment signals and that the sensor output signals being generated while the shaft carrying the wheel at rest is made vibrate, are corrected by the values of the adjustment signals.

The further processing of the sensor output signals is essentially simplified in that the sensor output signals are digitalized. Such digitalization may be effected directly upon a possible amplification of the sensor output signals so that the subsequent calculation units can process digital signals.

The comparison of the sample signals with the sensor output signals in a preferred embodiment of the method under the present invention is particularly simple, which method is characterized in that the sensor output signals are transformed into frequency spectra and that said frequency spectra are compared to one another and/or are mutually correlated, respectively Therein it is advantageous if the sensor frequency spectra are standardized and the noise level of the sensor frequency spectra is suppressed prior to or after the standardization.

The accuracy of the unbalance measurement can be substantially improved in the method mentioned in the beginning in that the sensor output signals in case of the wheel being driven are transformed into a unbalance frequency spectrum and that the unbalance values are calculated from the unbalance frequency spectrum. This method can be carried out manually inputting the wheel data in accordance with one of the above-identified methods. It is, however, advantageous to find the unbalance data as well as the specific wheel data by transforming the sensor output signals measured in case of the wheel being driven and in case of the wheel being at rest into frequency spectra and by analyzing the frequency spectra.

An advantageous embodiment of the method under the present invention consists in that the signals are generated in correspondence with the rotational speed of the wheel and are transformed into a frequency signal, that the spectral line relating to the frequency in accordance with the rotational speed of the wheel is selected from the unbalance frequency spectrum and is retransformed into a time spectrum or into another mathematical representation of a sinusoidal function and that the unbalance value and the position of the unbalance are calculated from the amplitude and the phase position of the retransformed time spectrum, referring to a zero-position reference signal. In this method the effective signal, namely the spectral line, is in a simple way selected from the unbalance frequency spectrum having the frequency of the rotational speed of the wheel and is evaluated subsequently. Therein all frequencies in the unbalance frequency spectrum with the exception of the effective frequency are suppressed, so that a high accuracy of measurement will result. There is no need of any filtering steps for filtering out the effective signal from the sensor signals, being electronically realizable with a lot of extra circuitry only The invention further relates to an apparatus for balancing a wheel of a vehicle or the like, namely a balancing machine comprising a shaft on which a wheel mounted thereon is rotatably drivable, electrical sensors being coupled to the shaft and issuing sensor output signals when forces are acting on the wheel, and a computer calculating the unbalance values from the sensor output signals in combination with specific wheel data and issuing such values, the balancing machine being characterized by calculation units in the computer, calculating the specific wheel data from the sensor output signals in case of the wheel at rest, being made vibrate.

Moreover, the invention relates to an apparatus for balancing a wheel of a vehicle or the like, namely a balancing machine comprising a shaft on which a wheel mounted thereon is rotatably drivable, electrical sensors being coupled to the shaft and issuing sensor output signals when forces are acting on the wheel, and a computer calculating the unbalance values from the sensor output signals in combination with specific wheel data and issuing such values, the balancing machine being characterized by a transformation calculation unit, transforming the sensor output signals generated while the wheel was driven into an unbalance frequency spectrum, and by calculating units calculating the unbalance values from the unbalance frequency spectrum in connection with the specific wheel data.

Finally, an advantageous embodiment of the balancing machine according to the present invention is characterized by an input means for inputting the sample signals and/or the specific wheel data corresponding to sample signals into memories In this embodiment it is possible to directly find or input, respectively, the sample signals and/or the specific wheel data of wheels the data of which have not yet been found or communicated by the manufacturer.

Preferred embodiments of the invention can be seen from the remaining subclaims in combination with the following description.

LIST OF FIGURES

DETAILED ACCOUNT OF WORKING EXAMPLE OF THE INVENTION

Figure 1:
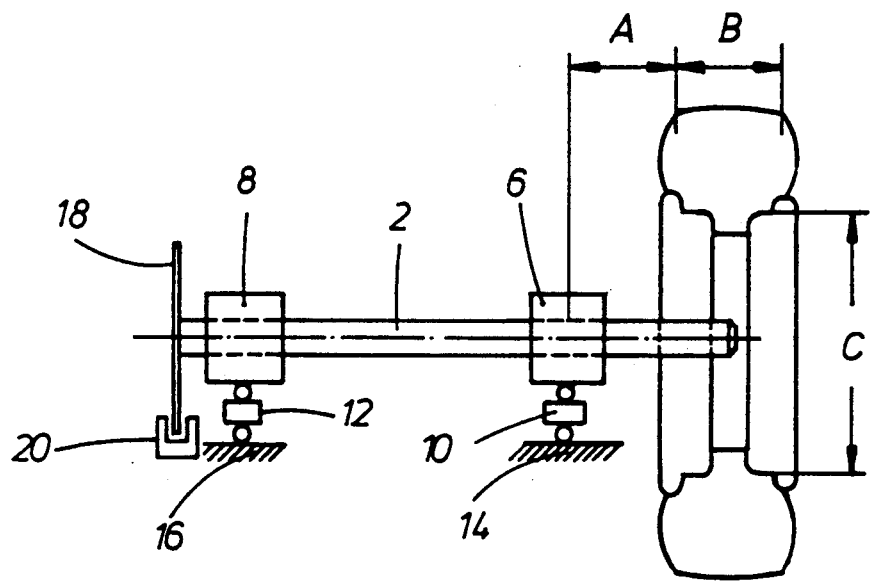
FIG. 1 is a schematic view of a wheel mounted on a shaft of a balancing machine.

In the schematic view of FIG. 1 a shaft 2 is shown, a wheel 4 being mounted on the shaft and being rotatably drivable together with the latter. The shaft 2 is supported by two bearings 6, 8 and the bearings are supported via force sensing members, namely sensors 10, 12, by supports 14, 16 and are arranged at a certain distance with respect to one another. The sensor 10 is referred to as inner sensor and the sensor 12 as outer sensor; these sensors 10, 12 issue output signals in form of time spectra when forces act on the wheel. An apertured or slotted disk 18 is mounted on the shaft 2, such disk acting in combination with a light barrier 20 for generating signals having a defined relation to the rotational speed of the shaft 2.

For being capable of calculating the unbalance data, namely the value of the unbalance and the angular position of the unbalance, from the sensor output signals the so-called specific wheel data, i.e. the data being peculiar for a wheel, are required, such data including the distance A of the inner wheel balancing plane to a bearing reference point of the inner sensor 10, the distance B between the inner wheel balancing plane and an outer wheel balancing plane as well as the balancing diameter C of the wheel, as is shown in FIG. 1.

Figure 2:
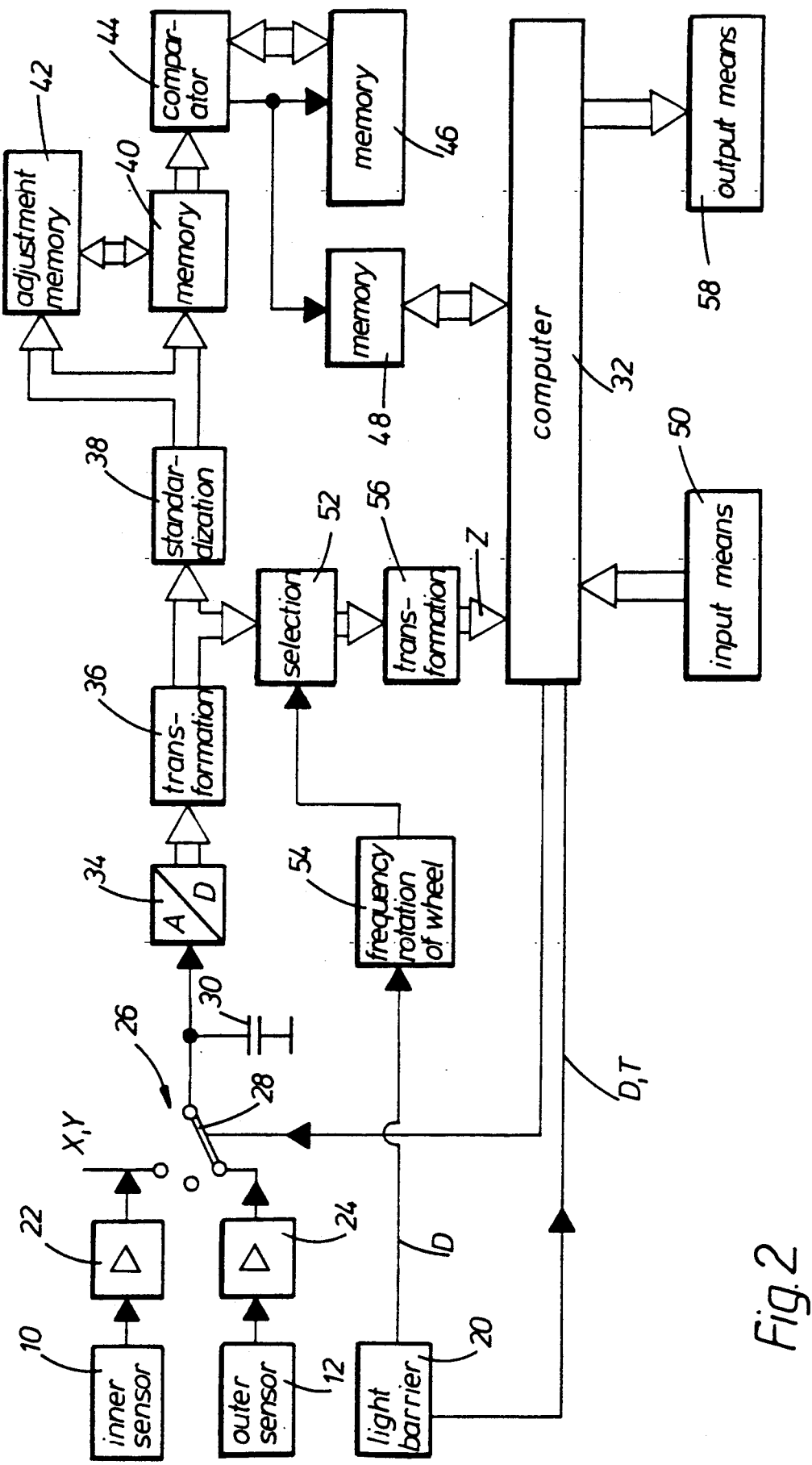
FIG. 2 is a block diagram of the measurement-/evaluation means of a balancing machine.

The measurement and evaluation means shown in the block diagram of FIG. 2 essentially serves for analyzing the sensor output signals for finding the specific wheel data and for calculating the unbalance data.

At first it is described in which way the specific wheel data are made available. For this purpose the wheel 4 at rest is made vibrate in natural vibrations by giving a blow to the wheel either manually or automatically by means of a ram. The natural vibrations of the wheel have a characteristic frequency spectrum as will be described later. The sensor output signals either of one or of both sensors 10, 12 are amplified in related amplifiers 22, 24 and are forwarded to a instantaneous value memory 26 represented by an electronic switch 28 and a capacitor 30. The switch 28 receives the clock signals for scanning the measuring values out of the sensor output signals from a computer 32. In the position shown in FIG. 2, of the switch 28 the output signal of the amplifier 24 is taken onto the capacitor 30. Prior to the respective value being taken in by the capacitor 30 into an analogue/digital converter 34, the switch 28 is brought into a position in which the connection between the amplifier 24 and the capacitor 30 is interrupted (middle position of switch 28).

The scanning signal forwarded from the computer 32 to the instantaneous value memory 26 for scanning the measurement values therein is generated in dependence on clock signals T issued by the light barrier 20. For this purpose the apertured disk 18 has, e.g., 128 apertures, so that 128 clock pulses are produced during one rotation of the wheel The number of 128 clock pulses per rotation of the wheel and the duration of the measurement, e.g. 10 sec., at a speed of 1 rotation per second results in a sufficient degree of resolution of the frequency spectrum upon the transformation in the transformation calculation unit 36.

The digital output signals of the analogue/digital converter are transferred to a transformation calculation unit 36, where the digitalized time spectrum of the sensor output signals is transformed into a complex frequency spectrum being specific for the type of wheel. This transformation may be effected by means of the Fourier transformation, the Laplace transformation, the so-called FFT transformation (Fast Fourier Transform), the so-called DFT transformation (Discrete Fourier Transform) and the like which can be realized using electronic means.

Figure 3:
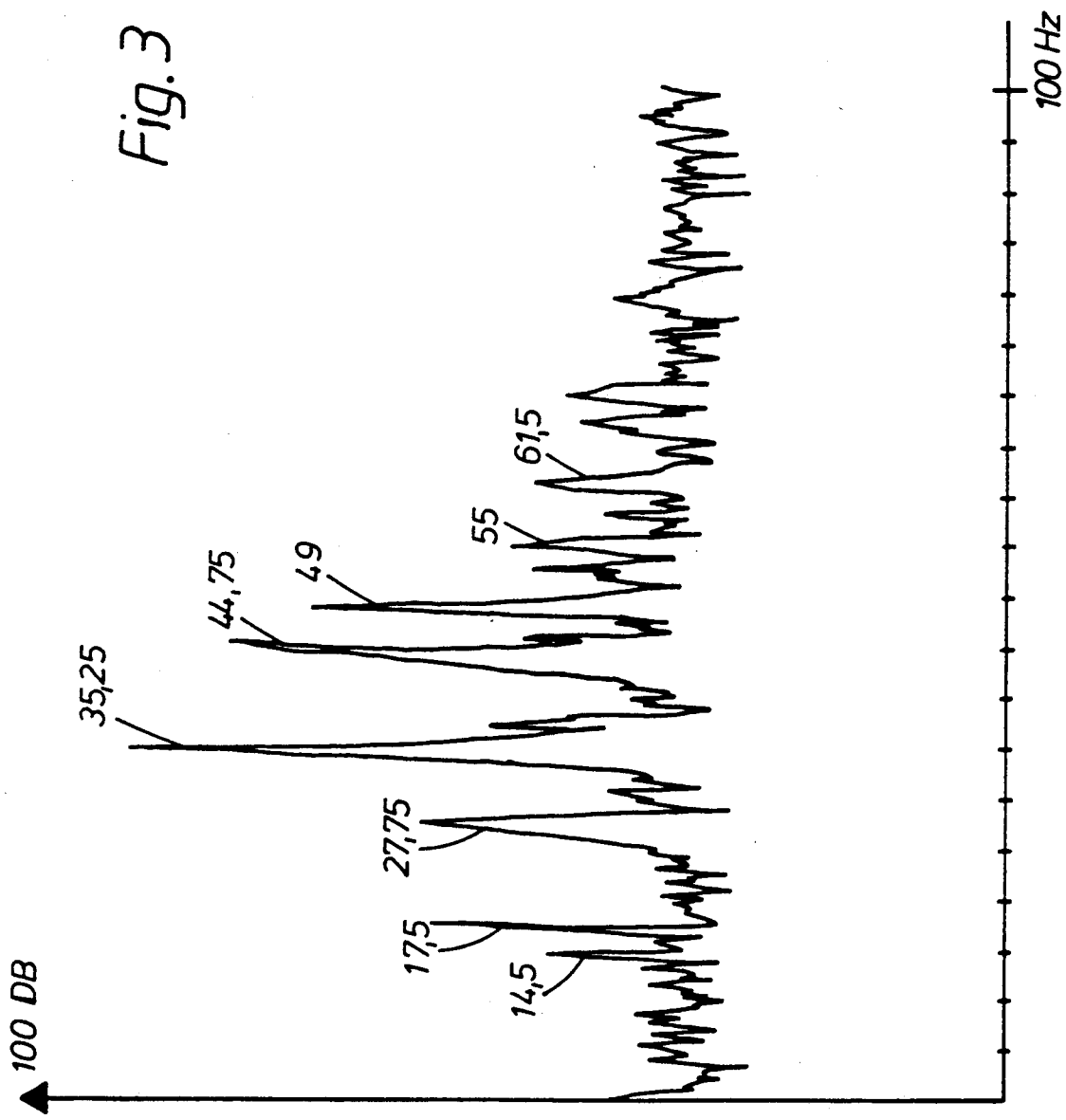
FIG. 3 is a characteristic frequency spectrum for a particular wheel.
Figure 4:
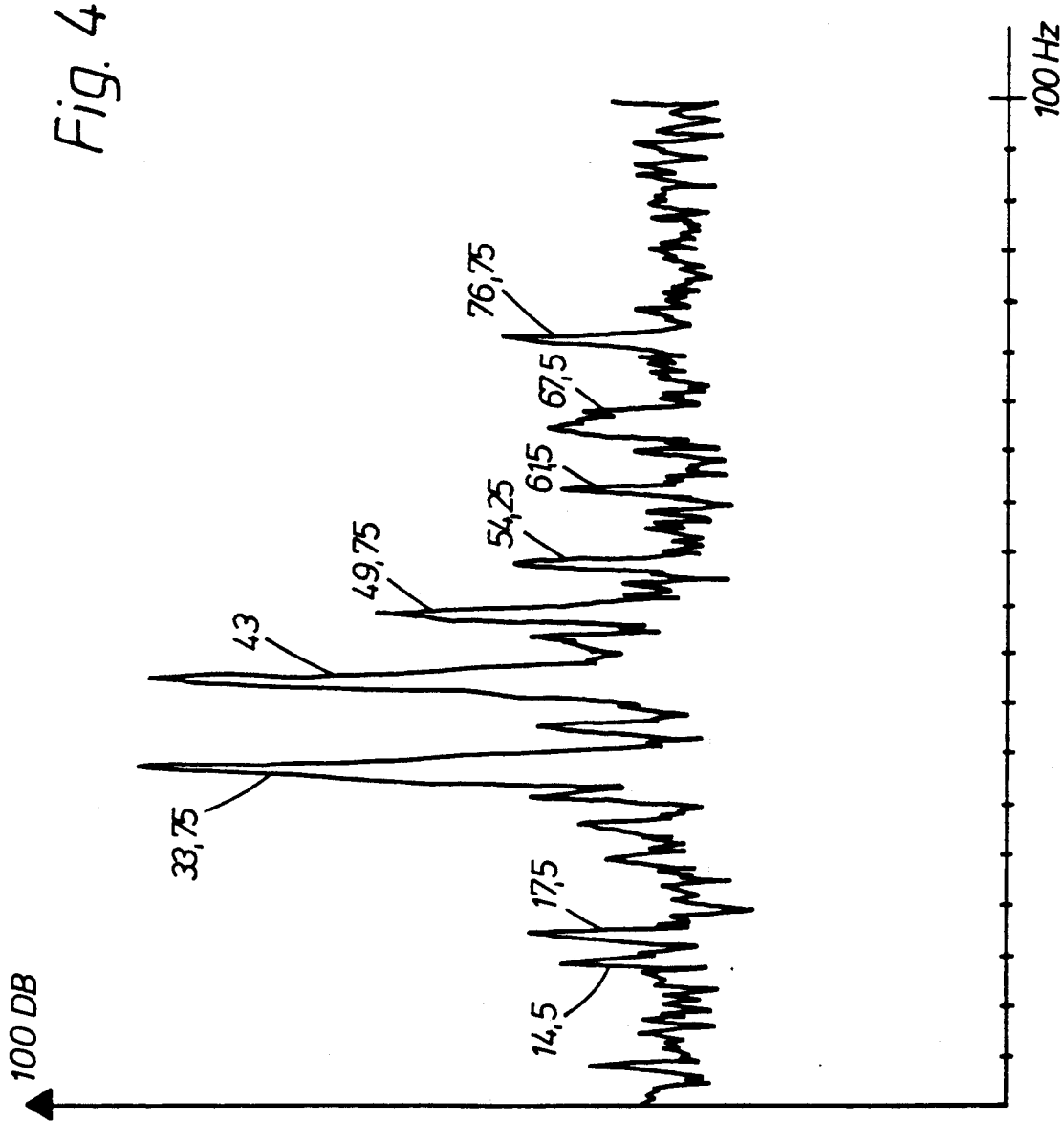
FIG. 4 is a characteristic frequency spectrum for another wheel.

Two examples of the frequency spectra being issued by the transformation calculation unit in result of a blow onto the wheel at rest are shown in FIGS. 3 and 4. FIG. 3 shows the characteristic frequency spectrum for a wheel with a rim breadth of 3.5 inches and a rim diameter of 10 inches. FIG. 4 shows the characteristic frequency spectrum for a wheel with a rim breadth of 4 inches and a rim diameter of 12 inches. It can be seen from FIGS. 3 and 4 that the respective frequency spectra of the wheels differ from one another in characteristic manner. Those characteristic differences in the following are analyzed for determining the type of wheel.

The frequency spectra issued by the transformation calculation unit 36 arrive at a standardization calculation unit 38 in which these frequency spectra are standardized for compensating for the effect of blows of different strengths on the wheel. The standardization of the frequency spectra may be effected in that the average value of the entire frequency spectrum is calculated and that the frequency spectrum thereafter is elevated or lowered depending on the deviation of the average value from a given reference average value. Another way of standardization lies in that in the frequency spectrum the amplitude of the spectral line with the largest amplitude is brought to a given value and that the remaining spectral lines are elevated or lowered accordingly. In order to allow a better further processing of the frequency spectrum the noise level of the frequency spectrum is suppressed. The noise level suppression can also be carried out in the standardization calculation unit 38.

The frequency spectrum at the output of the standardization calculation unit 38 apart from the spectral lines being characteristic for the respective wheel in addition contains spectral lines being characteristic for the particular balancing machine and being due to the natural vibrations thereof Therefore, the frequency spectrum at the output of the standardization calculation unit 38 is cleared with respect to the spectral lines being peculiar for the balancing machine For this purpose the standardized frequency spectra are fed to a correction calculation unit 40 being connected to an adjustment memory 42. The adjustment memory 42 contains the standardized frequency spectrum being peculiar for the balancing machine and the correction calculation unit 40 effects a correction of the frequency spectrum issued by the standardization calculation unit 38 by the adjustment frequency spectrum stored in the adjustment memory 42. At the output of the correction calculation unit 40, therefore, a cleared frequency spectrum is issued, such spectrum only containing the spectral lines being characteristic for the respective wheel.

The adjustment frequency spectrum in the adjustment memory 42 is measured once, e.g. prior to the first unbalance measurement, and is stored and thereupon may remain stored constantly, until changes in the balancing machine require a new adjustment operation. The measurement of the adjustment frequency spectrum is carried out in a way similar to that which has been described earlier, wherein only the shaft 2 of the balancing machine is made vibrate in natural vibrations, e.g., by a blow, and the sensor output signals resulting therefrom are processed through the instantaneous value memory 26, the analogue/digital converter 23, the transformation calculation unit 36 and the standardization calculation unit 39 and then are stored in the adjustment memory 42.

The spectrum at the output of the correction calculation unit 40 is fed to a comparator 44 being connected to a memory 46 in which sample frequency spectra for different types of wheels are stored. When the comparator 44 states identity of the frequency spectrum issued by the correction calculation unit 40 and the sample frequency spectrum stored in the memory 46, this information is passed to a memory 48 in which the specific wheel data A, B and C are stored in correlation with the sample frequency spectra in the memory 46. The memory 48 subsequently feeds the respective specific wheel data to the computer 32 so that they are available there for calculation of the unbalance values.

The sample frequency spectra in the memory 46 and-/or the specific wheel data in the memory 48 may either be stored by the wheel manufacturer himself directly or be found with the aid of the balancing machine and be stored then. In the latter case it just is necessary that a wheel the specific wheel data of which have been found, e.g. with the aid of a slide gauge is mounted on the machine, a blow is given to the wheel and the respective spectrum is processed as has been described above and is stored in the memory 48. The relating specific wheel data then are put in via an input means 50 into the memory 48. This also is true for the possibility of storing sample frequency spectra and wheel data of new types of wheels in the memories 46, 48.

After having thus guaranteed that the specific wheel data are available in the computer 32, it now is possible to find the unbalance values. For this purpose the wheel 4 mounted on the shaft 2 is made rotate and the sensor output signals of the two sensors 10, 12 upon having been amplified by the amplifiers 22, 24 are fed to the instantaneous value memory 26 which —as has been described earlier—receives a scanning signal from the computer 32.

After the signals having passed the analogue/digital converter 34 and the transformation calculation unit 36, the respective frequency spectrum is present at the input of the selection calculation unit 52 in which out of said frequency spectrum only the one spectral line is chosen which corresponds to the frequency of the rotation of the wheel. For this purpose the selection calculation unit 52 receives a signal from a frequency converter 54 which calculates the respective frequency from the output signal of the light barrier 20, such signal consisting of one pulse per rotation of the wheel (pulse train D in FIG. 5). The output signal of the selection calculation unit 52, consisting of the spectral line having the frequency of the rotation of the wheel is passed to a transformation calculation unit 56 which retransforms said spectral line into a time spectrum and feeds this signal to the computer 32. Like the transformation calculation unit 36 the transformation calculation unit 56 also is built with reversed function.

Figure 5:
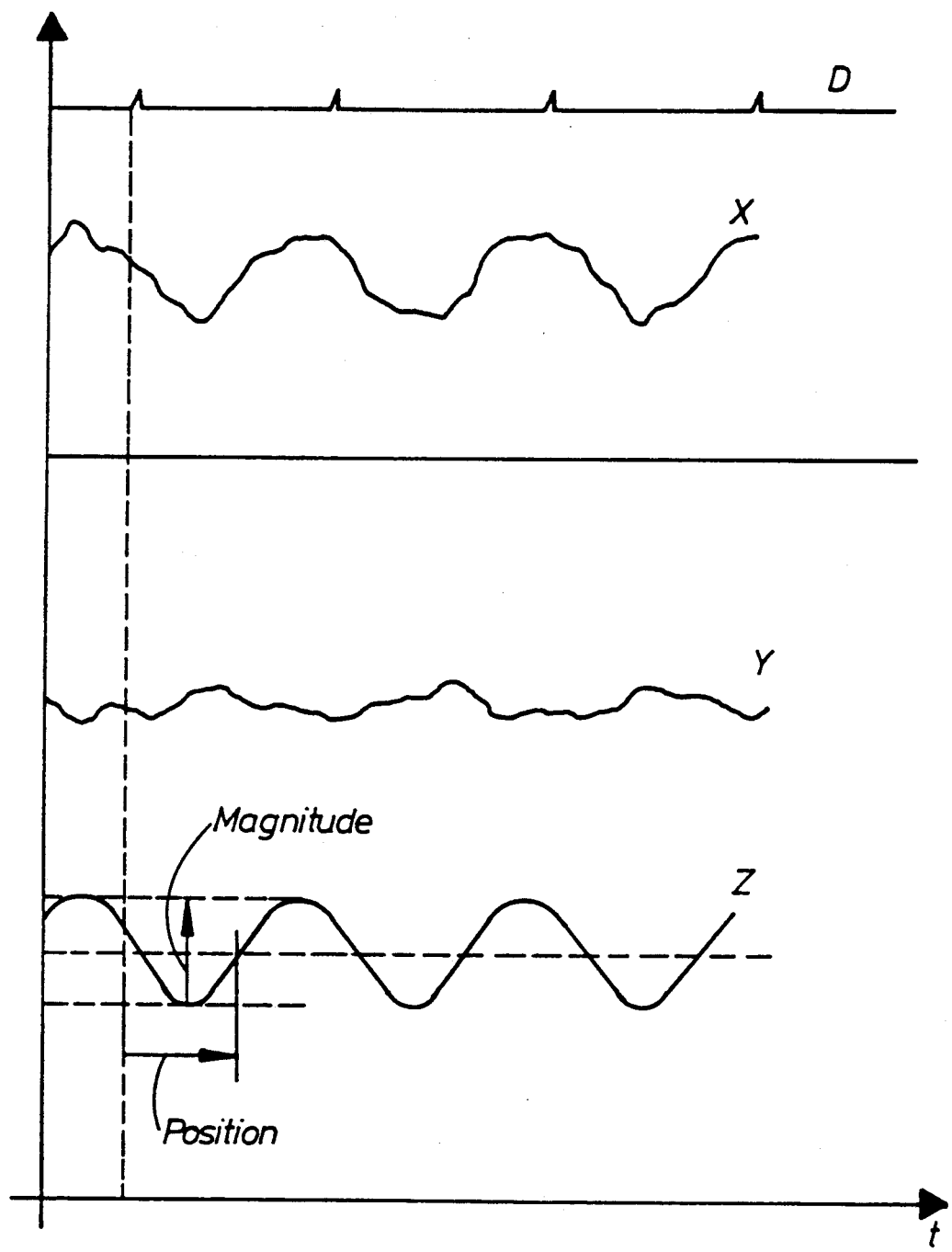
FIG. 5 is a graphic representation of measured unbalance signals as well as of a corrected effective unbalance signal.

FIG. 5 in the uppermost line shows the pulse train issued by the light barrier 20, having one pulse per rotation of the wheel and also being passed to the computer 32. The second graph shows the time spectrum x of an sensor output signal being present in point X in FIG. 2. Such time spectrum is issued by an sensor with a favorable relation of the effective signal to the noise signal. The spectrum y is the time spectrum of the output signal of an sensor having an unfavorable relation of the effective signal to the noise signal. Spectrum Z finally is the time spectrum of the signal being present in position Z in FIG. 2 and being the effective signal being correlated in the computer 32 with the specific wheel data being present there. In the computer 32 the unbalance value is calculated from the peak distance of the sinusoidal wave of the spectrum Z and the position of the unbalance is calculated from the distance of the zero-passage of the sinusoidal wave from the relating pulse of the pulse train D of the light barrier 20. FIG. 5 shows in particular that in the above-described measurement of the unbalance values an effective signal Z is available, such signal permitting to derive exact measurement values. Therefore, the computer 32 can calculate accurate unbalance values out of this measurement signal and the wheel data and can feed such data to a display means 68.

What is claimed:

1. Method for analyzing a wheel of a vehicle with a balancing machine comprising a shaft on which a wheel being mounted thereon is rotatable, electrical sensors being coupled to the shaft and issuing sensor output signals when forces are applied to the wheel, and a computer calculating and issuing balancing values form the sensor output values in connection with specific wheel data being peculiar to the wheel to be balanced, said method including the steps of vibrating the wheel while it is at rest, and calculating specific wheel data from the sensor output signals which are issued by the sensors on vibration of the wheel.

2. Method under claim 1, wherein the wheel at rest is vibrated by a blow.

3. Method under claim 1, wherein sample signals being characteristic for one type of wheel each and the relating specific wheel data are stored, and the sensor output signals are compared to the sample signals, and retrieving values of the stored specific wheel data relative to a type of wheel having sample signals corresponding to the sensor output signals.

4. Method under claim 3, wherein the sensor output signals are digitalized.

5. Method under claim 3, wherein the shaft at rest without a wheel thereon is made to vibrate, and the sensor output signals issued thereupon are stored as adjustment signals, and said adjustment signals are used to correct the sensor output signals generated when the shaft at rest with a wheel mounted thereon is vibrated.

6. Method under claim 5, wherein the sensor output signals are digitalized.

7. Method under claims 3, wherein the sensor output signals are transformed into frequency spectra and said frequency spectra are compared to or correlated with one another, respectively.

8. Method under claim 7, wherein the sensor frequency spectra are standardized.

9. Method under claim 7, wherein the noise level of the sensor frequency spectrum is suppressed prior to the comparison with the sample frequency spectra.

10. Method for analyzing a wheel of a vehicle with a balancing machine comprising a shaft on which a wheel being mounted thereon is rotatable, electrical sensors being coupled to the shaft and issuing sensor output signals when forces are applied to the wheel, and a computer calculating and issuing unbalance values from the sensor output values in connection with specific wheel data being peculiar for the wheel to be balanced, wherein the sensor output signals in case of a driven wheel are transformed into an unbalance frequency spectrum, and the unbalance values are calculated from the unbalance frequency spectrum.

11. Method under claim 10, wherein signals corresponding to the speed of the wheel are generated and are transformed into a frequency signal, and the spectral line having the frequency corresponding to the speed of the wheel is selected from the unbalance frequency spectrum and is retransformed into a time spectrum, and the value and the position of the unbalance are calculated from the amplitude and the phase position with respect to a zero-position reference signal, of the time spectrum operated by retransforming the unbalance frequency spectrum 12. Method under claim 11, wherein the sensor output signals are digitalized prior to being transformed into frequency spectra.

13. Balancing machine comprising a shaft on which the wheel being mounted thereon is rotatable, electrical sensors being coupled to the shaft and issuing sensor output signals when forces are applied to the wheel, and a computer calculating and issuing unbalance values from the sensor output values in connection with specific wheel data being peculiar for the wheel to be balanced, said computer comprising calculation units calculating the specific wheel data from the sensor output signals which are produced by vibrating a wheel which is at rest.

14. Balancing machine under claim 13, said computer comprising a first memory for storing the sample signals, a second memory for storing the specific wheel data relating to the sample signals, a comparator for comparing the sensor output signals to the sample signals and a transfer means with the aid of which the specific wheel data are fed to the calculation means under the control of the comparator.

15. Balancing machine under claim 14, comprising an adjustment memory in which adjustment signals are stored and a correction calculation unit in which the sensor output signals are corrected by the adjustment signals.

16. Balancing machine under claim 13, comprising a transformation calculation unit in which the sensor output signals are transformed into frequency spectra.

17. Balancing machine under claim 16, comprising an instantaneous value memory and a subsequent analogue/digital converter which feeds the digitalized signals to the transformation calculation unit.

18. Balancing machine under claim 16, comprising a standardization calculation unit in which the frequency spectra are standardized.

19. Balancing machine under claim 13, comprising an input means for inputting the sample signals and/or the specific wheel data, corresponding to a sample signal into the memories.

20. Balancing machine comprising a shaft on which a wheel being mounted thereon is rotatably rotatable, electrical sensors being coupled to the shaft and issuing sensor output signals when forces are applied to the wheel, and a computer calculating and issuing unbalance values from the sensor output values in connection with specific wheel data being peculiar for the wheel to be balanced, said computer comprising a transformation calculation unit transforming the sensor output signals produced in case of a driven wheel into an unbalance frequency spectrum and calculation units, calculating the balancing values from the unbalance frequency spectrum in connection with the specific wheel data.

21. Balancing machine under claim 20, comprising an instantaneous value memory and a subsequent analogue/digital converter which feeds the digitalized signals to the transformation calculation unit.

22. Balancing machine under claim 21, comprising a frequency converter receiving an input signal corresponding to the speed of the wheel and issuing a frequency signal corresponding to the speed of the wheel, a selection calculation unit selecting the spectral line of the wheel frequency from the unbalance frequency spectrum and a second transformation calculation unit retransforming the spectral line into a time spectrum or into another mathematical representation of a sinusoidal function and feeding it to the computer.

23. Balancing machine under claim 20, comprising an input means for inputting the sample signals or the specific wheel data, corresponding to a sample signal into the memories.

* * * * *